Patented Dec. 23, 1941

2,267,659

UNITED STATES PATENT OFFICE 2,267,659

PROCESS FOR THE PURIFICATION OF ZINC SULPHATE SOLUTIONS

Mario Magnaghi, Livorno, Italy

No Drawing. Application October 31, 1938, Serial No. 237,948. In Germany November 27, 1937

2 Claims. (Cl. 23—125)

The zinc sulphate solutions obtained from zinc ores or other zinciferous materials by attack with sulphuric acid must, in most cases, be purified of metallic impurities, such as iron, manganese, nickel, copper, lead, cadmium, etc.; this purification stage is of particular importance in case the solutions have to be used for the production of lithopone, as the impurities may cause the finished product to be coloured, or for the preparation of electrolytic zinc, as the impurities may impede the deposition of zinc and reduce the degree of purity of the zinc obtained.

The method hitherto generally adopted consists of first treating the solution with calcium hypochlorite, or permanganate of potassium, and limestone, in order to oxidise and precipitate the metals of the third group, such as iron and manganese, and subsequently with zinc powder, in order to precipitate the metals of the second and fourth groups, such as copper, lead, cadmium and nickel. "Third group" and "second and fourth groups," as used above, refer to qualitative analysis grouping, as outlined, for instance, in Standard Methods of Chemical Analysis, W. W. Scott, London, 1939, page 1110 et seq. The second treatment, however, often lasts very long, especially when a complete elimination of nickel should be obtained. It is also expensive, inasmuch as it requires the use of considerable quantities of zinc powder, and, finally, it is irregular, as strange variations in the behaviour of the zinc powder are observed which cannot be foreseen by analysis.

I have now found that a treatment of the zinc sulphate solutions with iron powder or cast iron powder permits the nickel to be precipitated in a rapid and complete way, and that therefore, by its application, the above mentioned inconveniences may be eliminated. As the iron powder during the treatment passes partially into solution, it is found to be convenient for this stage to precede the stage of purification of the metals of the third group; on the other hand, as the iron does not completely eliminate the metals of the second group, it is convenient to carry out subsequently a further treatment for this purpose, with small quantities of zinc powder, or even better, with sodium sulphide solutions. I have found that, when a sodium sulphide solution is used in the presence of a slight acidity, this last stage develops in a very rapid and complete manner: it is likely that this is due to the precipitation of small quantities of zinc sulphide in form of very slight flakes which facilitate the precipitation of the sulphides of the second group.

One may, then, proceed in the following manner: The zinciferous material is attacked with sulphuric acid; the solution is purified of nickel, by treating it at the boiling point with cast iron powder or iron powder, hereinafter referred to generally as "iron powder"; after filtration, it is treated with calcium hypochlorite, or permanganate of potassium, and limestone, in order to oxidise and precipitate the iron and manganese salts; after filtration, it is treated with sodium sulphide solution, in order to eliminate the metals of the second group; after another filtration, the solution is finally treated once more with small quantities of calcium hypochlorite, in order to remove the last traces of iron and manganese.

*Example.*—10 cubic meters of a zinc sulphate solution are taken, which contain from 345 to 350 gr./l. of this salt and the following impurities: 0.025 gr./l. of nickel, 0.03 gr./l. of cadmium and copper. The solution is treated at the boiling point with 25 kg. of cast iron powder; after filtration, it is treated with 60 kg. of calcium hypochlorite and 50 kg. of limestone in powder; after another filtration, it is treated with 200 l. of sodium sulphide solution containing 40 gr./l. of crystallised salt in the presence of 1 gr./l. of sulphuric acid at 50° Bé. It is left in contact for from 2 to 3 hours; after a further filtration it is treated with 2 kg. of calcium hypochlorite, in order to eliminate the last traces of iron and manganese. The analysis of the final solution gives the following results: Ni<0.00015 gr./l.; Cd<0.0005 gr./l.; Cu nil.

Having now particularly described and ascertained the nature of my said invention and in what manner the same is to be performed, I declare that what I claim is:

1. The process for the purification of zinc sulphate solutions containing nickel and metals of the second group, which comprises treating the solution with iron powder alone to precipitate the nickel, separating the liquid from the precipitate, then treating the liquid with limestone and an oxidizing agent selected from the group consisting of calcium hypochlorite and permanganate of potassium to precipitate the iron, again separating the liquid from the precipitate, then treating the liquid with sodium sulphide to precipitate the metals of the second group, and then separating the liquid from the precipitate.

2. The process for the purification of zinc sulphate solutions containing nickel and metals of the second group, which comprises treating the solution with iron powder alone to precipitate the nickel, separating the liquid from the precipitate then treating the liquid with limestone and an oxidizing agent selected from the group consisting of calcium hypochlorite and permanganate of potassium to precipitate the iron, again separating the liquid from the precipitate, then treating the liquid with a solution of sodium sulphide slightly acidified with sulphuric acid, to precipitate the metals of the second group, and then separating the liquid from the precipitate.

MARIO MAGNAGHI.